(12) United States Patent
Dunk

(10) Patent No.: US 7,001,546 B2
(45) Date of Patent: Feb. 21, 2006

(54) METHOD FOR THERMOSTATICALLY CONTROLLING MOLD TEMPERATURES

(75) Inventor: Phillip J. Dunk, Statesboro, GA (US)

(73) Assignee: G H. Tool & Mold, Inc., Washington, MO (US)

( * ) Notice: Subject to any disclaimer, the term of this patent is extended or adjusted under 35 U.S.C. 154(b) by 443 days.

(21) Appl. No.: 10/215,687

(22) Filed: Aug. 8, 2002

(65) Prior Publication Data

US 2003/0030167 A1 Feb. 13, 2003

Related U.S. Application Data

(60) Provisional application No. 60/311,143, filed on Aug. 9, 2001.

(51) Int. Cl.
*B29C 45/73* (2006.01)

(52) U.S. Cl. ............... 264/40.6; 264/327; 264/328.18; 425/552

(58) Field of Classification Search .............. 264/40.6, 264/327, 328.16; 425/143, 144, 552, 407; 236/93 A See application file for complete search history.

(56) References Cited

U.S. PATENT DOCUMENTS

| | | | |
|---|---|---|---|
| 2,048,024 A | 7/1936 | Peirce | 22/153 |
| 2,795,381 A * | 6/1957 | Eskin | 236/93 R |
| 3,667,248 A | 6/1972 | Carlson | 62/225 |
| 3,844,332 A | 10/1974 | Bucci | 164/70 |
| 3,854,520 A | 12/1974 | Yokota | 164/291 |
| 3,874,933 A | 4/1975 | Mocas | 136/135 |
| 3,977,459 A | 8/1976 | Bonitz | 164/98 |
| 4,420,446 A | 12/1983 | Wieder et al. | 264/40.6 |
| 4,664,171 A | 5/1987 | Boenisch | 164/16 |
| 4,987,945 A | 1/1991 | Corbett | 164/235 |
| 5,035,276 A | 7/1991 | Corbett et al. | 164/34 |
| 5,055,025 A * | 10/1991 | Muller | 425/144 |
| 5,344,597 A | 9/1994 | Robertson | 264/40.6 |
| 5,421,397 A | 6/1995 | Hembree et al. | 164/457 |
| 5,525,050 A | 6/1996 | Takizawa et al. | 425/143 |
| 5,772,933 A | 6/1998 | Kotzab | 31/40.6 |
| 5,813,601 A * | 9/1998 | Priest et al. | 236/93 A |

(Continued)

FOREIGN PATENT DOCUMENTS

JP 6347118 8/1986

(Continued)

*Primary Examiner*—Jill L. Heitbrink
(74) *Attorney, Agent, or Firm*—Scott A. Smith; Polster, Lieder, Woodruff & Lucchesi L.C.

(57) ABSTRACT

A method and apparatus for thermostatically controlling mold temperatures. The molding apparatus includes at least two die sections and a thermostatic control valve. At least one of the die sections has a cooling channel extending through portions of the die section. The cooling channel has an inlet end connected to a source of cooling fluid and an outlet end connected to an exhaust line. The thermostatic control valve is interposed in the exhaust line and has closed and open conditions. In the closed condition, the flow rate of fluid through the cooling channel is restricted causing the temperature of the die section to increase. In the open condition, the flow rate of fluid through the cooling channel is increased causing the temperature of the die section to decrease. The thermostatic control valve automatically moves between the open and closed conditions responding to the temperature of fluid through the cooling channel.

6 Claims, 3 Drawing Sheets

U.S. PATENT DOCUMENTS 6,145,804 A    11/2000  Baumann et al. .............. 249/79
6,332,770 B1 * 12/2001  Oueslati et al. ............. 425/547
6,601,819 B1 *  8/2003  Mizukusa .................... 249/79

FOREIGN PATENT DOCUMENTS

JP          11-347705    * 12/1999

* cited by examiner

METHOD FOR THERMOSTATICALLY CONTROLLING MOLD TEMPERATURES

CROSS-REFERENCE TO RELATED APPLICATIONS

This application claims the benefit of U.S. Provisional Application Ser. No. 60/311,143, filed Aug. 9, 2001, which is expressly incorporated herein by reference.

BACKGROUND OF THE INVENTION

1. Field of the Invention

The present invention relates generally to thermostatic control of cooling fluids, and more particularly, but not by way of limitation, to an improved method and apparatus for controlling the temperatures of individual mold zones heated by repeated cycles of high pressure injection of molten metal or plastic into mold impressions, by controlling the flow of outgoing coolant using precisely calibrated, temperature sensitive, flow control thermostatic control valve at individual cooling channels.

2. Brief Description of Related Art

To control heat transferred into molds by molten metal or plastic used in molding processes, individual impression areas and components are cooled by separate cooling channels drilled through the impression material. These channels are plumbed to an intake manifold and an exhaust manifold.

Mold impression temperatures have a significant impact on production cycle times and cast part quality. Practical, reliable, and economical control of impression temperatures is normally limited by the design (size and location) of individual cooling channels. Quality mold designs use central manifolds to supply cooling water into the die, and separate manifolds fitted with ball valves to receive heated outgoing coolant water. This design minimizes complexity and reduces production setup time by providing one main connection at each side of the mold cooling system.

Ball valves are often used on the exhaust side cooling manifold to control the flow rate of coolant through the cooling channels to refine temperatures of the coolant; increasing flow reduces coolant and mold temperatures, while restricting flow acts to increase temperatures by exposing the coolant to the heated die steel for a greater period of time. This is the most common, reliable, and economical method for temperature control once the sizes and locations of the cooling channels have been established.

The shortcoming of the ball-valve system is that a valve setting is only valid if all process variables remain the same (e.g., the same amount of BTU's are put into the mold). Metal temperatures, cycle time, spray quantity and duration, hold times and other variables can fluctuate and significantly change the amount of heat introduced into the mold. To control coolant/steel temperatures properly, the control method must measure and accommodate (modulate) changes in the process in order to maintain a stable production process.

While methods for controlling mold temperatures automatically have been proposed, such methods involve the restricting the flow of coolant on the intake side of the mold. When using a coolant control method that restricts flow, the flow of coolant should be controlled on the exhaust side of the mold so as to control the flow of coolant exiting the mold. Flow should not be restricted on the intake side of the mold as it may result in an under supply of coolant to the cooling channels and cause mold problems related to overheating of the coolant. Overheating coolant can result in overheating/damage of die steel and coolant boiling which may deposit undesirable mineral scale within the lines that act as an insulator, further reducing cooling efficiency and overheating problems.

To this end, a need exists for an improved method and apparatus for controlling the temperatures of individual mold zones heated by repeated cycles of high pressure injection of molten metal or plastic into mold impressions, by controlling the flow of outgoing coolant using precisely calibrated, temperature sensitive, flow control thermostatic control valves at individual cooling channels. It is to a method and apparatus that the present invention is directed.

DETAILED DESCRIPTION OF THE INVENTION

Figure 1:
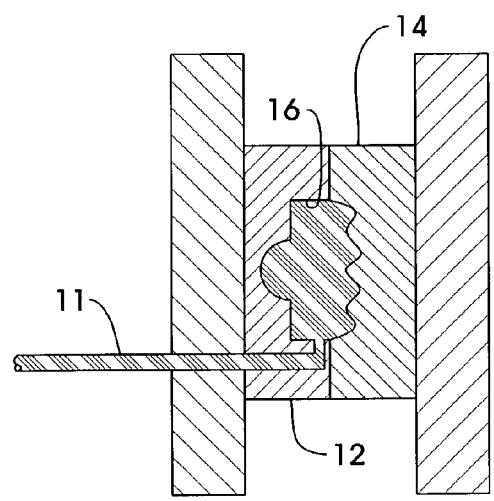
FIG. 1 is a cross sectional view of an injection mold assembly.

Referring now to the drawings, and more particularly to FIG. 1, a mold assembly 10 for forming an article by the injection of a molten material, such as metal or plastic, into the mold assembly 10 is illustrated. The mold assembly 10 includes a stationary die section 12 and an ejector die section 14 moveable relative to one another between a closed position and an open position. In the closed position, the die sections 12 and 14 cooperate to define a mold cavity 16 in which a molten material, such as metal or plastic, is injectable to produce an article. In the open position, the die sections 12 and 14 are separated to permit removal of the formed article.

Figure 2:
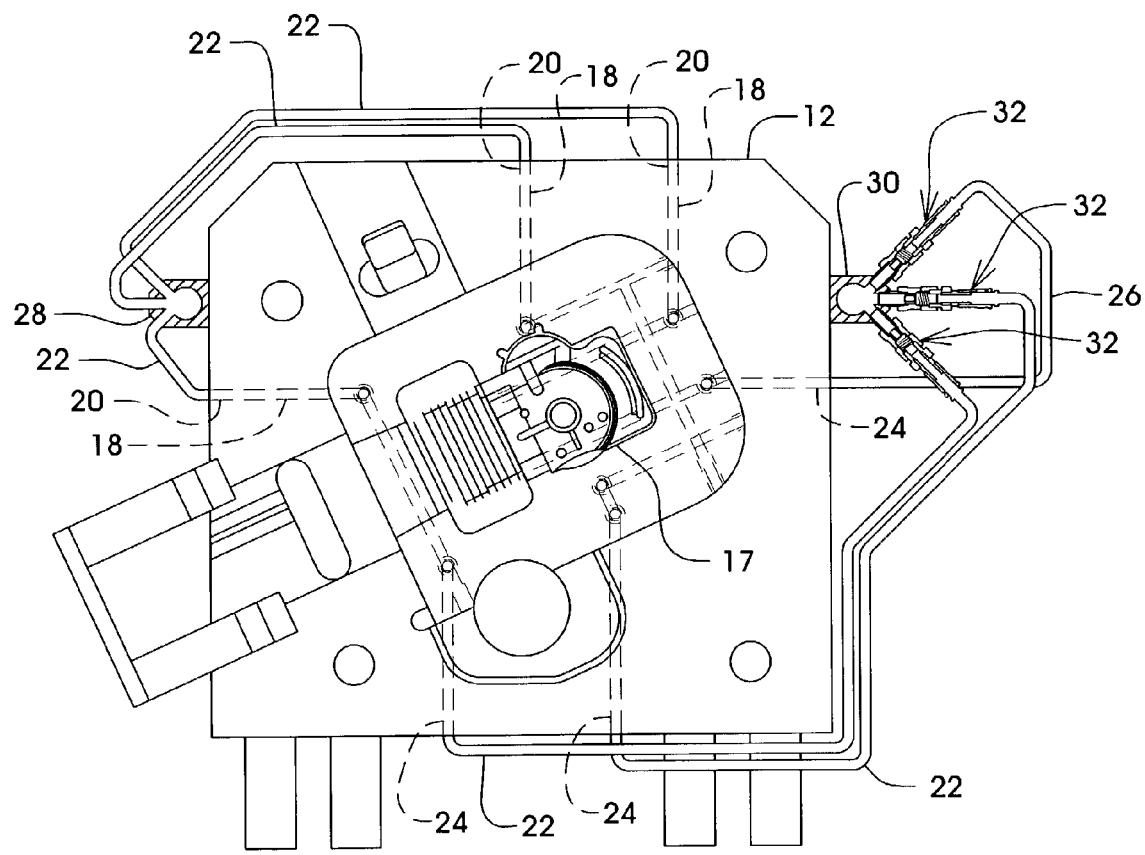
FIG. 2 is an elevational view of a stationary die of the injection mold assembly of FIG. 1 constructed in accordance with the present invention.
Figure 3:
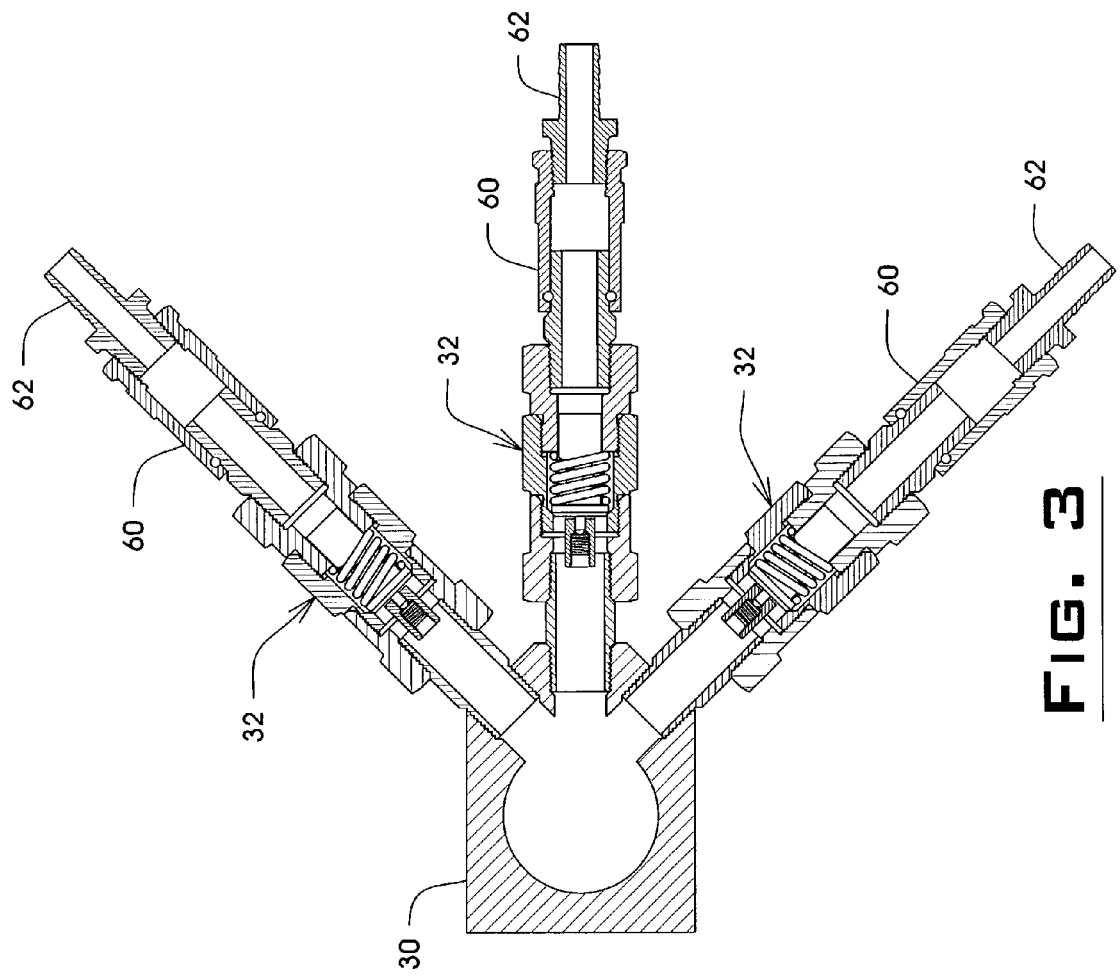
FIG. 3 is a cross sectional view of the exhaust manifold of the mold illustrating the connection of three thermostatic control valves thereto.

Referring now to FIG. 2, the stationary die section 12 is shown in greater detail. However, it should be understood that the stationary die section 12 and the ejector die section 14 are similar in that each of the die sections 12 and 14 are provided with a plurality of cooling channels 18 which are formed through select locations of the die sections 12 and 14 so that a cooling fluid, such as water, may be circulated through the die sections 12 and 14 to draw heat from the die sections 12 and 14. As best shown in FIG. 3, each of the cooling channels 18 of the stationary die section 12 has an inlet end 20 connected to an intake line 22 and an outlet end 24 connected to an exhaust line 26. Each of the intake lines 22 is connected to an intake manifold 28 which is in turn connected to a source of cooling fluid (not shown). Similarly, each of the exhaust lines 26 is connected to an exhaust manifold 30 which may in turn be connected to a cooling tower (not shown) whereby the coolant is recycled or directed to a disposal line (also not shown).

A thermostatic control valve 32 is interposed in each of the exhaust lines 26. The thermostatic control valves 32 control coolant temperatures, and thus die steel temperatures, by automatically modulating the flow of exhaust coolant based on its temperature in order to maintain optimum impression temperatures for the molding process.

Figure 5:
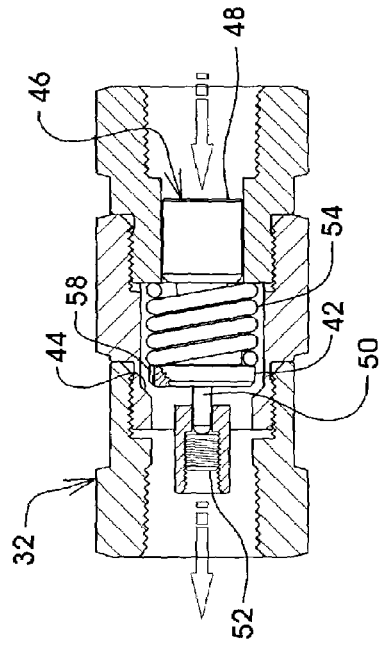
FIG. 5 is a cross sectional view of the thermostatic control valve of FIG. 4 shown in an open condition.
Figure 4:
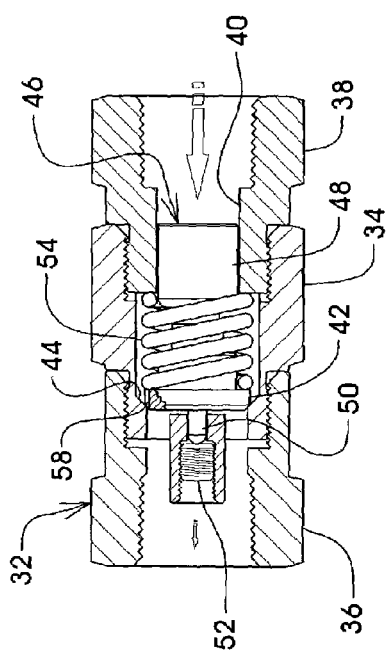
FIG. 4 is a cross sectional view of the thermostatic control valve shown in a closed condition.
Figure 6:
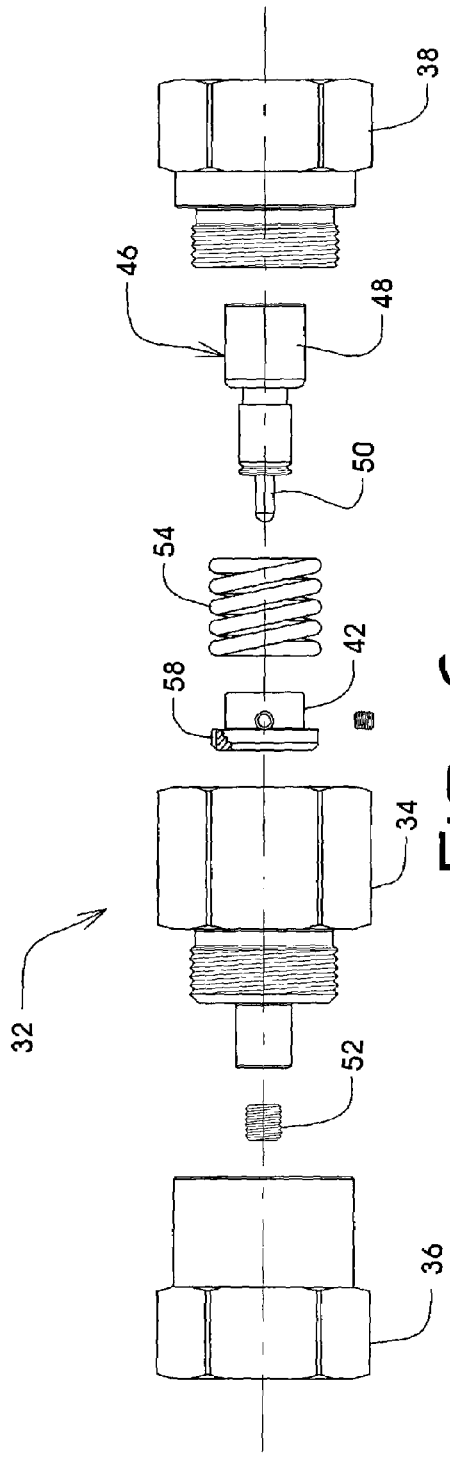
FIG. 6 is an exploded view of the thermostatic control valve.

Referring to FIGS. 4 and 5, the thermostatic control valve 32 moves from a closed condition (FIG. 4) to an open condition (FIG. 5) in response to temperature changes of the cooling fluid passing through the cooling channel 18 of the stationary die section 12 whereby a select operating temperature range of the stationary die section 12 is maintained automatically. In the closed condition, the flow rate of the cooling fluid passing through the cooling channels 18 of the stationary die section 12 is caused to be restricted so as to cause the temperature of the stationary die section 12 to increase. In the open condition, the flow rate of the cooling fluid passing through the cooling channel 18 is increased to cause the temperature of the stationary die section 12 to decrease.

Normally, cooling channels 18 are designed to remove heat from components. However, it is sometimes desirable to increase component temperatures. By restricting the flow of coolant to reduce the flow rate of the coolant and thus keep the coolant in the die sections 12 and 14 longer, it is possible to increase component temperatures. Increased die section temperatures can help improve casting yields and part quality in situations where molten metal and the impression material tends to run cold as a result of distances from the gate, thin cast walls, heavy die steel sections and the like. Also during cold die start-up when coolant flow is not needed, cooling a cold mold increases the warm-up period needed to get the die to steady state and make good parts whereby thermal differences within the die may create alignment problems between die components with different thermal growth rates, and in other specific situations.

As previously stated, the primary shortcoming of elevating die section temperatures using static flow settings to restrict flow rates, is that there is no mechanism to keep the coolant/mold temperatures from continuing to rise if the heat input increases. Using static flow settings significantly limits the capability of cooling channels 18 to increase temperatures unless the restricting valves are manually monitored (as temperatures rise) and adjusted by hand on a continuous basis. The only practical system to control elevated coolant temperatures must be capable of modulating the flow of coolant once a set coolant temperature has been achieved.

The thermostatic control valve 32 includes a valve body 34, a front cap 36, and an end cap 38 which are connected together so as to cooperate to define a fluid flow passageway 40. The thermostatic control valve 32 further includes a poppet 42 adapted to sealingly engage against a seat 44 of the valve body 34 and a temperature sensing actuator assembly 46. The actuator assembly 46 is preferably of the type that has a cup 48 enclosing a heat sensitive wax mixture which melts and expands with increasing temperatures and solidifies and contracts with decreasing temperatures.

Figure 7:
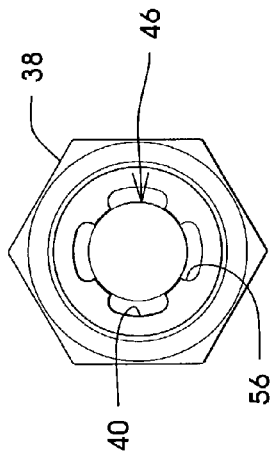
FIG. 7 is an end view of the thermostatic control valve of FIG. 5.

As the wax mixture is heated by fluid contacting the cup 48, the wax mixture is caused to expand in volume thereby forcing the actuator piston 50 outwardly against a calibration screw 52 provided in the valve body 34 which in turn causes the poppet 42 to move away from the seat 44 of the valve body 34 and allow fluid to flow around the poppet 42. As the temperature of the cooling fluid decreases, the wax mixture is caused to contract in volume thereby permitting the actuator piston 50 to be retracted toward the wax mixture by a biasing forcing provided by a spring 54 and thereby result in the poppet 42 sealingly engaging the seat 44 of the valve body 34 to shut off the flow of coolant around the poppet 42. As shown in FIG. 7, the end cap 38 is provided with a plurality of guide ribs 56 (FIG. 7) which serve to maintain the actuator assembly 46 in axial alignment with the fluid flow passageway 40.

The actuator assembly 46 is typically manufactured so that the piston 50 travels +/−0.050 inches within a given temperature range. Therefore, each thermostatic control valve 32 must be calibrated in assembly. Once the preset temperature is achieved, the calibration screw 52 located in the valve body 34 is adjusted against the piston 50 to accommodate the piston 50 travel variation. Use of the calibration screw 52 allows a variety of thermostatic control valves 32 to be manufactured from one actuator by taking advantage of the functional temperature range of each actuator wax formulation.

The movement of the piston 50 determines the functional range of the actuator assembly 46. To provide adequate flow change by movement of the poppet 42 when the poppet 42 opens and closes, it is preferable that the piston 50 have a minimum travel of about 0.015 inches per Fahrenheit degree change over about an eight to ten degree range.

To assure that the actuator assembly 46 is sensing the actual coolant temperature and that the coolant flow is not completely interrupted, it is desirable that approximately five to fifteen percent of the full open volume of fluid continue to flow through the thermostatic control valve 32 when the thermostatic control valve 32 is in the closed position. To this end, the valve body 34 is provided with an appropriately sized bypass conduit 58.

Due to the relatively low production volumes and the wide range of thermostatic control valves 32 required to control individual mold zone coolant temperatures, it may be impractical to stock pre-calibrated thermostatic control valves 32 in specific temperature ranges before they are needed. Therefore, the construction of the thermostatic control valve 32 provides flexibility. The front cap 36, valve body 34, end cap 38, spring 54, poppet 42, and calibration screw 52 are interchangeable on all thermostatic control valves 32. The actuator assembly 46 has a limited functional range (temperatures at which there is useful movement of stem). Therefore, when assembling thermostatic control valves 32 for a specific temperature, the appropriate range actuator assembly 46 must be used.

To aid assembly and simplify manufacturing, the valve body 34, the front cap 36 and the end cap 38 are preferably fabricated from 1.25 inch hex aluminum bar stock. The poppet 42 is also made from aluminum bar stock. All aluminum components are hard anodized to prevent corrosion from cooling water. The spring 54 and the calibration screw 52 are stainless steel to resist corrosion. The calibration screw 52 is provided with a nylon pellet or sealant in the threads to prevent movement after calibration. All other plumbing components used to connect the thermostatic control valve 32 to the exhaust lines 26 are commonly purchased items used in mold plumbing applications.

As coolant temperatures to be controlled can be below the ambient temperature of typical plant environments, and the actuator assemblies 46 are formulated to work within these lower temperatures, low temperature actuator assemblies 46 are kept refrigerated to prevent the piston 50 from being pushed out before assembly. Once installed in the valve body 34, the piston 50 cannot extend further than the calibration screw 52 allows, so refrigeration is no longer required.

To reliably accommodate various coolant pressures, the assemblies are leak tight to 100 psi. Various standard NPT fittings are used to connect the thermostatic control valves 32 to the exhaust manifold 30 and quick-connect fittings 60 connected to the exhaust lines 26. The valve body 34, the front cap 36 and the end cap 38 are provided with fine threads and square shoulders that act as a seals. A small amount of thread sealant is used in assembly to prevent leakage and unthreading of the assembly from vibration or heat so that no separate gaskets are required. Output lines from the mold range from ⅛" NPT to ½" NPT. The valve body 34, the front cap 36, and the end cap 38 are each threaded at ½ inch NPT to allow flexibility of use over a variety of pipe sizes (reducers are used when needed).

After assembly, each thermostatic control valve 32 is attached to a recirculating unit designed to accurately control bath temperatures within +/−0.50° C. range. The assemblies could also be immersed directly into the bath for calibration or the fluid can be pumped directly through the unit, as it would be in production. The appropriate temperature for the water line is set on the recirculator, the thermostatic control valve 32 is connected, and the flow is turned on. The calibration screw 52 is adjusted in or out until the poppet 42 is closed based on observation of the flow rate. The thermostatic control valve 32 is now calibrated to the specific temperature for the individual line in the mold. By using the calibration screw 52 to calibrate, rather than squeezing the cup 48 (done in the manufacture of automotive-type thermostats) the actuator assembly 46 is not permanently set at one temperature, and it may be recalibrated and used for a variety of mold zones if within the effective temperature range of the actuator assembly 46.

The thermostatic control valve 32 may be tested by increasing or reducing the temperature of the recirculator to assure the thermostatic control valve 32 is properly opening and closing at the specified temperature. Tests show the thermostatic control valve 32 goes from closed (except bypass flow) to completely open within a 1° to 2° F. range. This level of accuracy is beneficial for controlling mold temperatures. Each thermostatic control valve 32 is then labeled with its calibrated temperature and the identity of the appropriate coolant channel 18.

In practice, each exhaust line 26 is separately plumbed at the exhaust manifold 30 with an appropriately calibrated thermostatic control valve 32 as best shown in FIG. 3 with quick-connect fittings 60 and hose barbs 62. Damaged thermostatic control valves 32 can be replaced or temperature changes can be made by removing the quick-connect fittings 60 and replacing the thermostatic control valves 32 while the die sections 12 and 14 are in the closed position. The present invention does not rely on separate sensing and control devices. The thermostatic control valves 32 measures and controls flow with one assembly, and the control is specific to the needs of individual cooling channels 18. The present invention is applicable to any molding operation where heat is being removed and temperatures need to be accurately controlled on a mold, for example, plastics, die cast, and semi-solid.

Correlation between water line temperatures and corresponding die component temperatures depends on an assortment of variables (distance of line to mold surface, part geometry, line size, flow rates, etc). Incoming coolant temperatures are relatively low and in many molds (dies), small differences in coolant temperatures (from 1° to 2° F.) have a significant effect on die component temperatures. Therefore, thermostatic control of mold cooling is dependent on very precisely calibrated custom thermostatic control valves 32 designed to be used on specific cooling channels 18 over small temperature ranges (temperature differences between incoming and exhaust coolant). Precise calibration is critical to the success of the thermostatic control valve 32. Response time (change in valve opening per degree of change in coolant temperature) is the second requirement for thermostatic control of mold cooling. The thermostatic control valve 32 must be capable of opening and closing within a very narrow temperature range (1° F.) to maximize effectiveness. Based on practical production considerations, any system for controlling established coolant and subsequent mold temperatures must be small enough to be plumbed into the existing manifold system without getting in the way of the operation of the mold press, must be self regulating without the need to outside adjustment or calibration, and must be accurate and reliable in the harsh die cast environment.

Testing is performed to establish and correlate the most efficient production settings for a variety of cooling line temperatures. Impression and corresponding coolant line temperatures are documented and compared with data on production counts and part quality issues until the most efficient temperatures are established. Detailed testing to establish optimum impression and cooling temperatures is critical to creating baseline temperatures for calibrating the thermostatic control valves 32. It is important to measure actual exhaust coolant temperatures on the outgoing side of the ball valves used during testing (ball valves may be used initially to manipulate flow rates and subsequent cooling line temperatures).

In practice, mold zone temperatures and adjustments are determined through the use of thermal imaging cameras, hand held non-contact thermometers, or thermocouples within the mold. A schematic of the mold and corresponding manifold(s) is created to document the temperature and location of each thermostatic control valve 32. Changes are documented. If a thermostatic control valve 32 is damaged or fails in production, a simple reference to the schematic allows easy replacement or changes.

The temperature change between incoming and outgoing coolant can be less than 5° F. due to the limited time the coolant is within the mold and allowed to absorb heat (flow rate). The amount of absorbed heat is sometimes so small that "looping" lines is possible (reusing an outgoing line by running it directly back into another incoming line) provided the incoming looped line temperature is not greater than the designed exhaust temperature of the subsequent cooling line. Exhaust lines 26 should only be looped back into incoming lines where the component it supplies is running below the desired temperature. Looping lines simplifies plumbing of the cooling system and reduces water usage by reducing the discharge of used cooling water. In situations where plant-cooling capacity is limited, this can be a significant energy and/or waste water savings. Restricting coolant flow until it is needed, such as during start-up, allows the thermostatically controlled system to reduce cooling water usage and reduce the startup duration—a cost and energy savings to the molding facility.

Once good production process parameters have been established, controlling variables that affect those parameters is critical. Accurate thermostatic control of mold coolant temperatures is a significant advancement in controlling variables, increasing reliability, minimizing setup time, reducing coolant usage and energy use, and improving casting yields.

The method of the present invention precisely controls preset temperatures of individual mold zones heated by repeated cycles of high pressure injection of molten metal or plastic into mold impressions, by controlling the flow of outgoing coolant using precisely calibrated, temperature sensitive, flow control thermostatic control valves 32 at individual cooling channels 18. By regulating the flow of coolant based on its temperature, individual mold zones can be heated and cooled. Restricting the flow of coolant (exposing the coolant to the hot mold components longer) removes less heat and increases mold temperatures. Increasing flow reduces coolant exposure to heated die components and it more efficiently cools the mold. Molds are commonly designed to control cooling by area or zone, as part geometry can produce a variety of cooling requirements within the same mold. Each zone can have a different optimum coolant temperature and should be controlled individually.

The design does not depend on separate measurement and flow control devices. The design requires no outside adjustment as optimum temperatures are preset (calibrated) and maintained by a continuously modulating valve powered by the heat within the mold and a temperature sensitive thermostatic actuator assembly 46. Temperatures are regulated by modulation of the thermostatic control valve 32. The design measures outgoing (exhaust) coolant temperatures, so it is not affected by variation in incoming coolant temperatures, flow rates, or pressure.

The thermostatic control valves 32 are designed to be installed in central manifolds accepting all outgoing water lines, but may be installed in-line in the exhaust side of any water circuit. To simplify component manufacture and stocking, the assembly components can be used interchangeably in any thermostatic control valve 32. Calibration for the optimum water line temperature is controlled by the adjustment set screw 52 in the valve body 34. All components are built from corrosion-resistant materials and coated as necessary to prevent corrosion when using ordinary, untreated tap water as a coolant.

The present invention is designed to control relatively low temperature coolant, typically run through a heat exchanger to achieve coolant temperatures similar to ordinary tap water. Very small changes in coolant temperature can have a significant effect on the temperature of the mold component being controlled. Because differences as small as 1° F. can correlate into significant differences in mold temperatures, the invention is designed to modulate coolant flow within a very small temperature range (1°–2° F.). Coolant flow is controlled from fully closed (except bypass flow) to fully open free flow within this temperature range.

Flow rates are controlled on the exhaust side of the mold to assure coolant lines are always full of coolant even if the flow rate is restricted. Restricting water line coolant on the incoming coolant side can result in under supplied water lines, coolant boiling, mineral deposit buildup and overheating/damage to mold components. To assure the actuator assembly 46 is measuring the actual temperature of the coolant in the mold, and not stagnant coolant trapped by a closed thermostatic control valve 32, and to prevent the above discussed under supply issues, the bypass conduit 58 allows approximately five to fifteen percent of the full open flow even when the thermostatic control valve 32 is closed.

Molds and mold components equipped with these controls may be setup in less time, reach steady-state or operational temperature faster (coolant does not flow until preset temperatures are reached), use less coolant, and produce higher yields as component temperature variables are accurately controlled.

From the above description it is clear that the present invention is well adapted to carry out the objects and to attain the advantages mentioned herein as well as those inherent in the invention. While a presently preferred embodiment of the invention has been described for purposes of this disclosure, it will be understood that numerous changes may be made which will readily suggest themselves to those skilled in the art and which are accomplished within the spirit of the invention disclosed and as defined in the appended claims.

What is claimed is:

1. A method of controlling the temperature of a molding apparatus comprising at least two die sections moveable relative to one another between a closed position and an open position, in the closed position the die sections cooperate to define a cavity in which a molten material is injectable to produce an article and in the open position the die sections are separated to permit removal of the formed article, each of the die sections having a plurality of cooling channels extending through select zones of the die section, each of the cooling channels having an inlet end connected to a source of cooling fluid and an outlet end connected to an exhaust line, the method comprising:

providing ball valves for each of the cooling channels;
interposing each of the ball valves in the exhaust line of the corresponding channel;
performing multiple test runs of the molding apparatus;
adjusting the ball valves during the test runs so that the molding apparatus operates under a plurality of different operating conditions;
recording testing data during the test runs, the test data comprising at least mold cavity temperatures, cooling line temperatures, production count data, and part quality data;
analyzing the test data to determine an optimum operating temperature range for each of the select zones of the die sections and corresponding optimum temperature ranges for each of the thermostatic control valves;
removing the ball valves;
providing a thermostatic control valve for each of the cooling channels;
calibrating each thermostatic control to the corresponding optimum temperature range;
interposing each of the thermostatic control valves in the exhaust line of the corresponding cooling channel;
performing production runs of the molding apparatus; and
wherein each of the thermostatic control valves has a closed condition wherein the flow of the cooling fluid passing through the corresponding cooling channel of the die section is caused to be restricted in response to the temperatures of the cooling fluid being below a lower limit of the optimum operating temperature range so as to cause the temperature of the corresponding zone of the die section to increase and an open condition wherein the flow rate of the cooling fluid passing through the cooling channel is increased in response to the temperature of the cooling fluid rising above the upper limit of the optimum operating temperature range so as to cause the temperature of the corresponding zone of the die section to decrease whereby the selected operating temperature range of each of the zones of the die sections is maintained automatically;
the thermostatic control valve having a valve body defining a fluid flow passageway wherein a temperature sensing actuator assembly provided within the passageway is operatively connected to an adjustable calibration screw provided within the passageway for calibrating the optimum operating temperature range whereby the actuator assembly and calibration screw are not accessible for field calibration while the thermostatic control valve is interposed in the exhaust line.

2. The method of claim 1 wherein in the closed condition, a percentage of the full open condition flow rate is permitted to pass through the thermostatic control valve when the thermostatic valve is in the closed condition.

3. The method of claim 2 wherein in the closed condition, approximately five to fifteen percent of the full open condition flow rate is permitted to pass through the thermostatic control valve when the thermostatic control valve is in the closed condition.

4. The method of claim 1, further comprising the step of creating a schematic of the die sections to document the optimum temperature range and location of each thermostatic control valve.

5. The method or claim 1, wherein each thermostatic control valve is installed in a central manifold.

6. The method of claim 1, wherein analyzing the test data comprises the step of comparing the mold cavity temperatures and cooling temperatures with the production count data and part quality data.

* * * * *